United States Patent [19]

Schneider

[11] Patent Number: 4,519,082
[45] Date of Patent: May 21, 1985

[54] COLOR CENTER LASER, MATERIAL, AND METHOD OF LASING

[75] Inventor: Irwin Schneider, Alexandria, Va.

[73] Assignee: The United States of America as represented by the Secretary of the Navy, Washington, D.C.

[21] Appl. No.: 356,863

[22] Filed: Mar. 10, 1982

[51] Int. Cl.$^3$ .............................................. H01S 3/16
[52] U.S. Cl. ..................................................... 372/42
[58] Field of Search ........................................ 372/42

[56] References Cited

U.S. PATENT DOCUMENTS 4,301,426 11/1981 Schneider ............................ 372/42

OTHER PUBLICATIONS

Schneider et al., "Broadly tunable laser action beyond 3 μm from $(F_2^+)_A$ centers in lithium-doped KI", *Opt. Lett.* vol. 16, No. 12, Dec. 1981.
Koch et al., "Continuous-wave laser oscillation with extended tuning range in $F_A(11)-F_B(11)$ color-center crystals", *Opt. Lett.*, vol. 4, No. 12, Dec. 1979.
Schneider, "Lithium-$(F_2^{30})_A$ centers in alkali-halide crystals", *Opt. Lett.*, vol. 6, No. 3, Mar. 1981.
Schneider et al., Proc. of Internat'l Conf. on lasers '81, Dec. 14–18, 1981, "Laser action continuously tunable from 1.98 to 3.76μ using $F_2^+$ mol lithium $(F_2^+)_A$ centers in KI", pp. 385–386.
Schneider et al., "Tunable, continuous-wave laser action using $(F_2^+)_A$ centers in lithium-doped KCL, *Opt. Lett.*, vol. 5, No. 6, Jun. 1980.

*Primary Examiner*—James W. Davie
*Assistant Examiner*—Léon Scott, Jr
*Attorney, Agent, or Firm*—Robert F. Beers; Arthur L. Branning; Thomas E. McDonnell

[57] ABSTRACT

A laser material for a solid state tunable laser comprises a potassium or rubidium halide crystal with lithium and/or sodium cation impuritites in a crystallographic structure with point defects consisting essentially of $F_2^+$ and $(F_2^+)_A$ color centers and electron traps. The crystals are colored both additively and with ionizing radiation.

18 Claims, 6 Drawing Figures

COLOR CENTER LASER, MATERIAL, AND METHOD OF LASING

BACKGROUND OF THE INVENTION

The present invention pertains generally to methods of preparing laser materials and of lasing those materials and in particular to methods of suitably preparing color-center materials and for achieving broadly tunable lasing in those materials.

Color-center lasers have been particularly useful for providing tunable lasing in the infrared and near infrared spectral regions. Examples of color-center lasers which have been reported are: (1) B. Fritz et al. *Laser Effect in KCl with $F_A(Li)$ Centers* in Solid State Communications 3(3): 61–68 (1965), (2) U.S. Pat. No. 3,970,960 issued 20 July 1976 to Linn F. Mollenauer, and (3) I. Schneider and M. J. Marrone *Continuous-Wave Laser-action of $(F_2+)_A$ Centers in Sodium-Doped KCl Crystals,* Optics Lett. 4:390(1979). Color centers which have been made to lase include the $F_A$ center in several host crystals, such as KCl and RbCl, the $F_B$ center in KCl, and the $F_2^+$ center in LiF, KCl, NaCl, and KF.

Definitions of the above color centers are, herein, given for convenient reference. The $F_A$ center consists of one electron trapped in an anion vacancy adjacent to a substitutional cation impurity ion, i.e., an F center next to a cation impurity. The $F_B$ center consists of an F center adjacent to two cation impurities. The $F_2^+$ center is an electron trapped by two anion vacancies, i.e., a singly ionized pair of neighboring F centers along a <100> direction. If the $F_2^+$ center is adjacent to a substitutional cation impurity, e.g., $Li^+$ or $Na^+$ in a KCl crystal, it is referred to as a $(F_2^+)_A$ center.

The $F_A$ and $F_B$ centers, though useful, are limited to wavelengths between 2.2 and 3.3 microns. Also, since these centers require visible region excitation, they undergo extremely large Stokes shifts, which cause considerable lattice heating. As a result, the maximum output powers of these lasers are on the order of 150 mw. Furthermore, these centers have relatively narrow emission bands, so that, three different crystals are required to cover this spectral range.

The intrinsic $F_2^+$ center in the presently used crystals, e.g., LiF and KF, can produce several watts of laser power very efficiently. Furthermore, depending on host lattice they have laser emission in the spectral range between 0.8 to 2.0 microns. Their principal drawback is that the technique which has, heretofore, been used to produce them required that they be maintained at low temperatures to avoid permanent loss.

An important new class of color-center materials use the emission of $(F_2^+)_A$ centers for lasing in alkai halide crystals. The technique using these crystals as color-center lasers is disclosed and claimed in U.S. Pat. No. 4,301,426 by Irwin Schneider. Lasing is obtained from $(F_2^+)_A$ centers which are dynamically stabilized by the presence of $F_A$ and $F_B$ centers which trap ((F_2)-center electrons. This class of material provides laser action which is efficient, capable of pulsed or continuous operation, and broadly tunable, i.e., 1.6 to 1.9 microns and 2.0 to 2.5 microns using the $(F_2^+)_A$ centers in Na or Li-doped KCl, respectfully. However each time a new range is covered a new crystal and new experimental set-up is required.

The breadth of tunability of a color-center material can be considerably increased; provided, it is possible to fabricate materials in which two or more usable centers can be made to co-exist in concentrations large enough to result in an efficient lasing over the entire tuning range. Further, these centers must have non-overlapping emission band in order to have the breadth of the total lasing to be approximately the sum of the widths of the emission of the individual centers. It is also important that the centers have overlapping absorptions; so that, only one pump source is required. If these problems could be solved, an efficient, broadly tunable solid state laser could be operated over the spectrum from wavelenths less than two microns to those greater than two microns.

SUMMARY OF THE INVENTION

It is, therefore, an object of this invention to provide two lasing defects simultaneously within a single lasing material.

Another object of the present invention is to produce laseable potassium and rubidium halide crystals containing both $F_2^+$ and $(F_2^+)_A$ or $Li(F_2^+)_A$ and $Na(F_2^+)_A$ color centers with cation-impurity electron traps.

A further object of the present invention is to produce a lasing medium consisting of a single crystal which can be continuously tuned from about 1.5 to 2.5 microns and another which can be continuously tuned from about 2 to 4 microns.

These and other objects are achieved from a potassium or rubidium halide crystal having lithium or lithium and sodium impurities in concentrations sufficient to generate enough $(F_2^+)_A$ and $F_2^+$ centers or Li and $Na(F_2^+)_A$ centers for lasing and having sufficient electron traps to stabilize the $(F_2^+)_A$ and $F_2^+$ centers.

BRIEF DESCRIPTION OF THE DRAWINGS

A more complete appreciation of the invention and many of the attendant advantages thereof will be readily understood by reference to the following detailed description when considered with the accompanying drawings in which like reference numerals designate like parts throughout the figures and wherein.

DETAILED DESCRIPTION OF THE INVENTION

Figure 1:
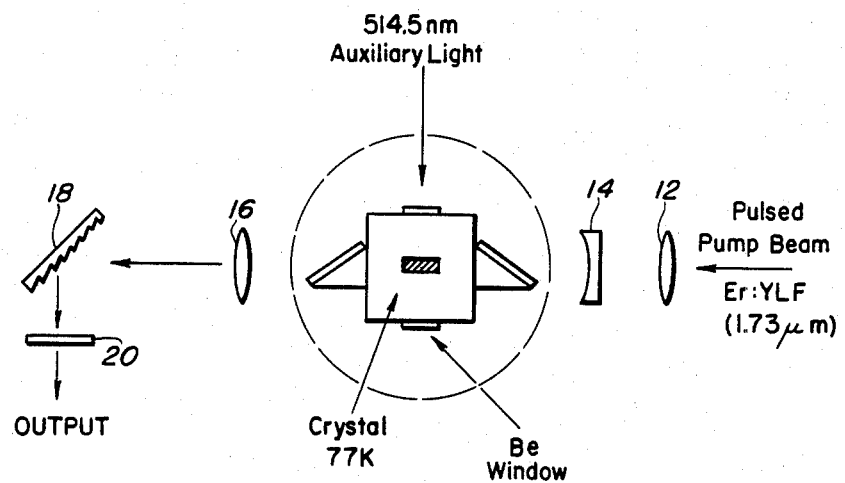
FIG. 1 is a schematic representation of the laser arrangement used to obtain laser action from the KI crystals of this invention.

The laser material of this invention is an isotropic alkali halide crystal containing anisotropic light-absorbing centers. The alkali is potassium or rubidium and the halide ion is fluorine, chlorine, bromine, or iodine. As with previous solid state laser materials, the alkali halide crystals of this invention are doped, during growth, with an impurity cation for eventually producing the ionic and electronic combinations of the proper structure. With this invention the impurity cation is lithium, sodium, or both.

The impurity cation(s) is introduced into the melt by the addition of halide salt having the anion corresponding to the halide of the crystal, e.g., lithium chloride would be added to a melt of potassium chloride. The amount of dopant halide depends on the specific cation. Lithium, having a larger segregation coefficient than sodium, must be added in a larger amount. Generally if both are added, more lithium is added than sodium. It is, however, possible to add too much lithium, thereby forming an excessive amount of colloids. Lithium can be added in an amount up to 1.2 mole percent based on total molar composition, but 0.5 to 1.0 is preferred. Sodium can be added in an amount up to 1.20 mole percent based on total molar composition, but 0.3 to 1.0 is preferred. If the amount is too small, then an insufficient number of $(F_2^+)_A$ centers are created for this invention. The minimum amount is 0.2 mole percent. If both are added, it is necessary to account for the differences in segregation coefficients in order to achieve comparable lithium and sodium in the final crystal boule. For example, concentrations of 0.1 to 0.2 mole percent of NaCl and 0.75 to 0.90 mole of LiCl added to a melt of sodium chloride, results in approximatley equal concentrations of sodium and lithium $(F_2^{30})_A$ centers. In crystals to be additively colored, the Na and Li impurities are all added to the melt; however, for crystals to be colored with ionizing radiation, it is also necessary to add certain other impurities to the melt.

The crystals of the present invention can be grown by any method which assures good optical quality. The preferable growth technique is the Kyropoulos process in which a crystal is grown from a seed inserted into the alkali halide liquid near its melt temperature.

Two different coloring technqiues can be used. One coloration technique is the additive coloration procedure, in which the crystal is colored by sealing the alkali halide in a tube with the alkali metal at a temperature from 50 to 250K below the crystal melt temperature. The other technique involves ionizing irradiation in which the crystal is colored by exposure to e.g. 2 MeV electrons at about 70 to 80K.

Prior to use, additively colored crystals are rough-polished, wrapped in aluminum, stainless steel, nickel, or platinum foil, annealed for several minutes at elevated temperatures and quenched to room temperature. The annealing step uniformally disperses the color centers and eliminates colloids. The foil is used to minimize crystal strains by reducing temperature gradients.

Following annealing the crystal is briefly repolished under a very dim red light. After mechanical polishing, the crystal is stirred from 5 to 15 seconds in concentrated hydrochloric acid, rinsed in ethyl and/or isopropyl alcohol, and dried by either blowing dry nitrogen across the surfaces or by drawing the wet surfaces across a dry polishing cloth. This treatment produces high-quality surfaces with a minimal scattering loss. Further details are given in U.S. Pat. No. 4,301,426, issued on Nov. 17, 1981 to Irwin Schneider, which is incorporated herein by reference.

The $(F_2^+)_A$ centers are produced in several stages starting with the formation of $F_2$, $F_A$ and $F_B$ centers near room temperature with near uv excitation (300–400 nm). This is followed by the conversion of $F_2$ centers to $(F_2)_A$ with the same excitation. For sodium $(F_2)_A$ centers this is done at 77K, for lithium $(F_2)_A$ near 200K. In doubly doped crystals, this conversion would be carried out at 180 to 225K. Finally, the $(F_2)_A$ centers are partly converted to $(F_2^+)_A$ centers again with the near uv excitation. The crystal is now ready for insertion at the beam waist of a laser cavity. With both types of $(F_2^+)_A$ center and the $F_2^+$ center present in large concentrations in a single crystal, stabilization becomes a critical factor. A key requirement for stabilizing this combination of color centers is that the ratio of $F_A$ and $F_B$ centers to F centers to be at least greater than 0.1 and preferably at least about 0.25 since trapping by $F_A$ and $F_B$ centers leads to defects which do not overlap the $(F_2^+)_A$ absorption band. Consequently the centers do not absorb pump excitation. The electron-transfer dynamical equations can be represented by the following reactions:

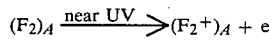

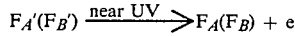

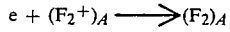

The other technique for preparing the crystals involves coloration at low temperatures with ionizing radiation. An addition to alkali separation, the crystal is also doped with divalent metal ion, $SH^-$ ion or hydroxyl ion impurities which now capture $F_2$ and $(F_2)_A$ electrons. These impurities are added during the crystal growth along with the alkali impurities. Examples of these electron-capturing impurities include $Pd^{++}$, $Pb^{++}$, $Mn^{++}$, $Fe^{++}$, $Sr^{++}$, $Sn^{++}$, $OH^-$, and $SH^-$. The amount of the impurity depends on the type of impurity, but all of the aforementioned impurities can be added in amounts from about 25 to about 200 ppm, and for the divalent metal ions the preferred amount is from 75 to 125 ppm.

In crystals colored through irradiation, the formation of $(F_2^+)_A$ centers involves an entirely different series of treatments, initiated by irradiating a polished crystal with 1.5 to 3.0 MeV electrons (4–20 $\mu$amp/un$^2$) from several minutes to hours. The crystal temperature is about 100K or less with 90 to 100K preferred. This irradiation creates the necessary F centers and anion vacancies in concentrations from about 0.8 to about $5 \times 10^{18}$ cm$^{-3}$. The vacancies are mobilized by annealing the crystal at temperatures from about 230 to about 275K, which causes the anion vacancies to migrate and become trapped by F centers to form $F_2^+$. This migration is terminated by cooling the crystal back down to 200K or less and preferably from 50 to 100K. Since electrons are released during the anneal, $F_2$ centers are also produced. These $F_2$ centers can be ionized optically (i.e., converted to $F_2^+$) by exposing the crystals to visible light. Choosing KI as an example, a convenient wavelength would be green light. If $Ar^+$ lasers are available, the 5145Å line is suitable and the exposure temperature is about 50 to about 100K. The maximum conversion occurs within about a one minute exposure. Preferably, the 5145-Å line is also used for RbI and the 4579Å line is used for KBr. This treatment results in an $F_2^+$-center absorption on the order of 1 optical density/mm.

To produce $(F_2^{30})_A$ centers, the crystal is warmed to about 130 to 180K. For potassium iodide crystals the preferred temperature is from 145 to 150K and for potassium bromide the temperature is from 155 to 160K. The crystals are then exposed to the same light used to produce the $F_2^+$ centers. The 5145-Å line is preferred for KI and RbI and the 4579-Å line is preferred for KBr. This excitation induces the $F_2^+ \rightarrow (F_2^+)_A$ conversion in which $F_2^+$ centers diffuse through the lattice through successive re-orientations until they encounter isolated $Li^+$ or $Na^+$ ions and become trapped. The $(F_2^+)_A$ concentration is typically about 20 to 25 percent of the original $F_2^+$ centers after full conversion because many $F_2^+$ centers annihilated with interstitial ions.

The color center crystals have been made to lase in a great variety of ways, using cavities of many designs. In general any reasonable, low-loss, stable, two or three element cavity can be used.

The conditions placed on cavities to achieve stable laser operations are described in several tutorial papers, e.g. H. Kogelnik and T. Li *Applied Optics* 5, 1550 (1966). In choosing a cavity design, consideration is given to the type of lasing to be achieved, the availability of cavity elements, and the accommodation to specific experimental constraints.

For example, a common cavity for achieving cw-pumped operation, using relatively low-intensity pumping sources, is a three mirror astigmatically, compensated cavity, such as the one described in H. W. Kogelnik *J. Quantum Elect*, QE-8, 373 (March, 1973) This cavity produces a tightly focused beam waist. Pulse operation usually involves greater pump intensities, thus relaxing the need for tight focussing.

Pumping can be carried out in a variety of ways, e.g. transverse (perpendicular to the laser cavity) or longitudinal (resonantly). In the lasing example, a KI crystal was choosen, colored by ionizing radiation and made to lase using an available pulsed laser source. Accordingly, the cavity was designed for that laser and the components were chosen and arranged accordingly. The color center laser was tuned using an output element which consisted of a Littrow-mounted grating. The grating provides tuning by reflecting most of the first order back to the cavity while transmitting the remaining (zeroth order) as output coupling. Clearly, the laser could just as easily be tuned using a wide range of other devices, such as birefringent plates. Furthermore, in the event that the $(F_2^+)_A$ centers were pumped using cw excitation, the folded astimatically compensated cavity would have been more appropriate. It is, therefore, understood that other equally suitable cavities can be used for lasing the crystal of this invention.

For the following examples, the dewar and cavity configuration were chosen to be suitable for achieving lasing without the need for warming to room temperature. If the crystals are additively colored, the requirement would no longer be present. Laser action was achieved using the three-element cavity configuration shown in FIG. 1. The crystal at 77K, located at the cavity beam waist between a dichroic input mirror 14 (r=30 cm) and a calcium fluoride lens 16 (f=10 cm), was pumped coaxially using a steering lens 12 (f=30 cm) with the 1.73 $\mu$m erbium laser line of a pump source not shown in the figure. The input mirror and lens were approximately 40 cm apart. The mirror had the high reflectivity coating for 2.4 to 4.3 micrometers. A Littrow-mounted diffraction grating, located about 45 cm from CaF$_2$ lens 16, served both as tuning element and output coupler. Pump filter 20 was standard and served to eliminate the pump unwanted wavelengths from the color centers las output.

The cyrstals used were grown by the Kyropoulos Technique and had 100–125 parts in $10^6$ Pd$^{2+}$. In addition, they also contained about 0.75 mol % of the corresponding lithium halide added to the melt. Luminescence and absorption were first monitored through conventional techniques. Luminescence was produced with light from a tungsten source passing through a grating monochromator. It was measured using a Perkin-Elmer Model 12C prism monchromator, cooled (77K) InSb detector, and lock-in amplifier. Absorption bands were determined either by using a Cary Model 14MR spectrophotometer of from excitation spectra of the emission. All spectra were measured at a crystal temperature of about 77K.

Figure 2:
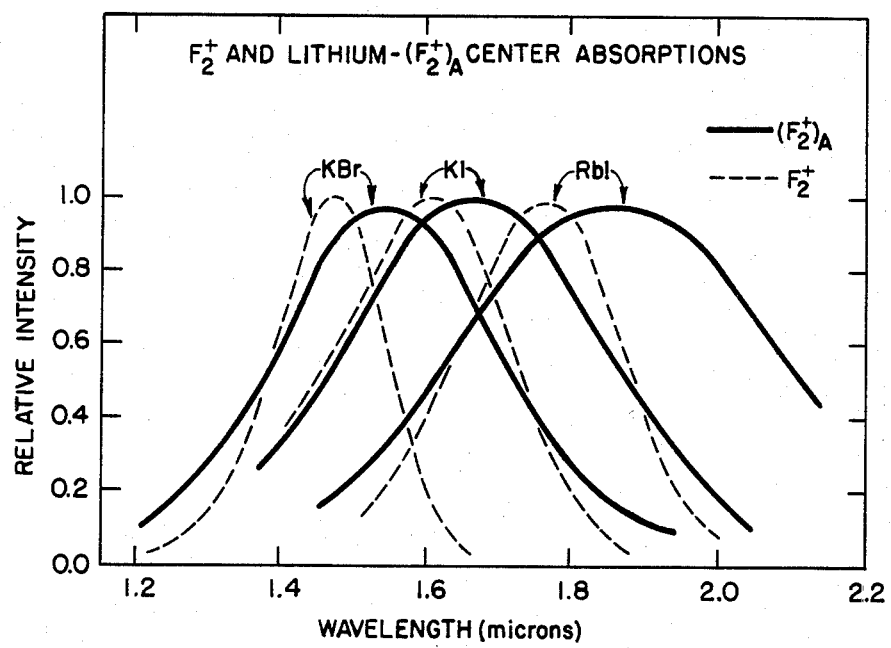
FIG. 2 is a graphic representation of the normalized absorption spectra of the $F_2^+$ and lithium-$(F_2^+)_A$ centers in KBr, Ki, and RbI at 77K.
Figure 3:
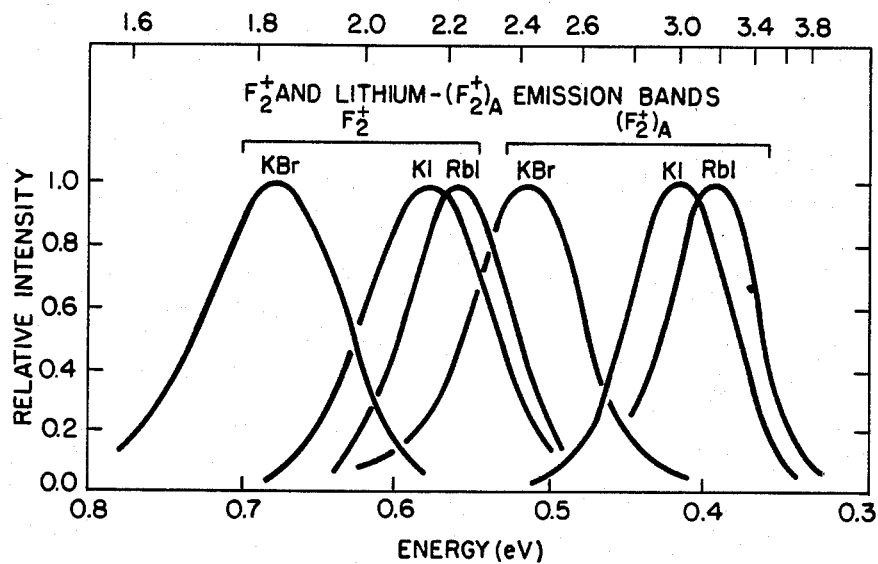
FIG. 3 is a graphic representation of the normalized emission spectra of the $F_2^+$ and lithium-$(F_2^+)_A$ centers in KBr, KI, and RbI at 77K.
Figure 4:
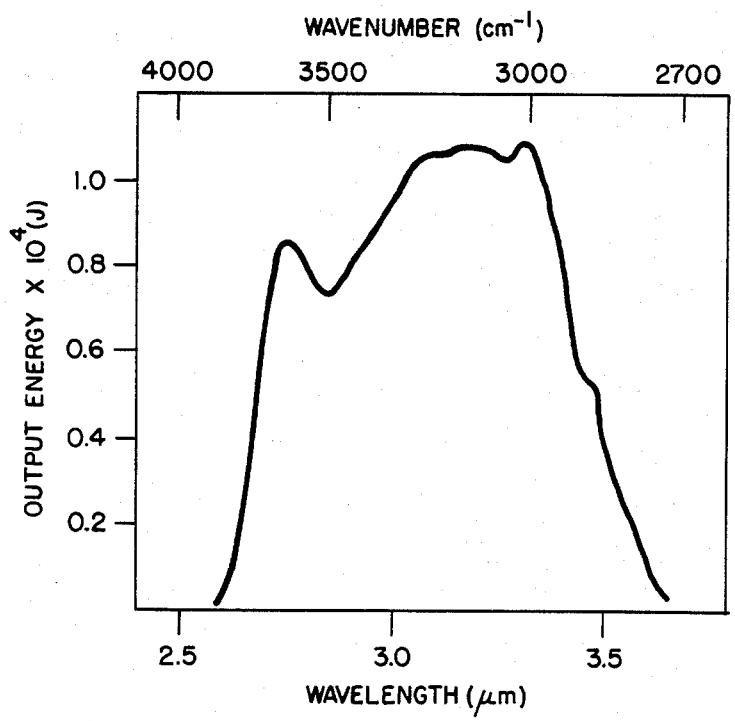
FIG. 4 is a tuning curve for the lithium $(F_2^+)_A$ center laser in KI.

In the first example, the process of formation of lithium $(F_2^+)_A$ centers is demonstrated in heavy alkali halides. The absorption and emission properties of these crystals are shown in FIGS. 2 and 3. The second example demonstrates in FIG. 4 the lasing of one of these $(F_2^+)_A$ centers in potassium iodide. The last example demonstrates lasing over a wide spectrum by using both $F_2^+$ and $(F_2^+)_A$ centers in a single matrix. It is understood that these examples are given by way of illustration and are not meant to limit the disclosure or the claims to follow in any manner.

EXAMPLE I

Lithium-$(F_2^{30})_A$ centers were produced in two stages, starting with the formation of $F_2^+$ centers and followed by the conversion of $F_2^+$ centers to $(F_2^+)_A$. The technique used in forming $F_2^+$ centers involved a sequence of treatments initiated by irradiating the crystals with 2 MeV electrons (5–20 $\mu$A/cm$^2$) for about 30 minutes at 77K. This irradiation created large concentrations of F centers and anion vacancies. The vacancies were mobilized by annealing all crystals at roughly 242–250K, where the vacancies migrate and are trapped by F centers to form $F_2^+$. During this process, the $F_2^+$ absorption (measured at 1.6 $\mu$m) increases and then decreases after reaching a maximum value. While this occurs, the $F_2$ absorption (measured at 1.01 $\mu$m) grows more slowly and increases monotonically attaining values $>$ 2 O.D./mm. The formation of $F_2$ centers involves trapping of electrons also released during the annealing. The $F_2^+$ absorption is then significantly enhanced (by over a factor of 5) by exposing the crystal at 77K to auxiliary green light, i.e., an expanded beam of 514.5 nm light from an Ar$^+$ laser. This enhancement results from the optical ionization of $F_2$ centers and trapping of electrons by Pd$^{2+}$ ions.

The ionization of the $F_2$ centers was carried out at 77K by exposing the crystals for about a minute to light from an Ar$^+$ laser. In particular, the 5145-Å line was used for RbI and KI, and the 4579-Å line for KBr. This treatment resulted in $F_2^+$-center absorption on the order of 1 optical density/mm.

Lithium-$(F_2^+)_A$ centers were produced in KI and RbI by next exposing the crystals at 148K to the 5145-Å line for about an hour. In KBr, the 4579-Å line was used at a crystal temperature of 158K. This excitation induced the $F_2^+ \rightarrow (F_2^+)_A$ conversion in which $F_2^+$ centers diffuse through the lattice through successive reorientations until they encountered isolated Li$^+$ ions and became trapped. This excitation, however, also lead to some permanent bleaching of $F_2^+$ centers presumably through annihilation with interstitial ions. As a result, only 20–25% of the initial $F_2^+$ centers were effective in the conversion.

Additional details of the method are given in Irwin Schneider, *Lithium -$(F_2^+)_A$ centers in Alkali-Halide Crystals*, Opt. Lett., Vol. 6, 157, March 1981, which is incorporated herein by reference.

The absorption and emission band peaks, measured at 77K are shown in Table I in units of microns.

TABLE 1

$F_2^+$ and Lithium-$(F_2^+)_A$ Center Absorption and Emission Band Peaks at 77 K (μm)

| Type of Center | KBr | | KI | | RbI | |
| --- | --- | --- | --- | --- | --- | --- |
| | Abs. | Em. | Abs. | Em. | Abs. | Em. |
| $F_2^+$ | 1.48 | 1.84 | 1.61 | 2.15 | 1.77 | 2.22 |
| Lithium-$(F_2^+)_A$ | 1.54 | 2.41 | 1.68 | 3.00 | 1.86 | 3.20 |

FIGS. 2 and 3 graphically illustrate the absorption and emission characteristics of these crystals. FIG. 2 shows that the lithium-$(F_2^+)_A$ center gives rise to absorptions that peak at roughly 1.54, 1.68, and 1.86 μm KBr, KI, and RbI, respectively. These all lie at slightly longer wavelengths than the corresponding absorptions of the $F_2^+$ center (see Table 1). Futhermore, the $(F_2^+)_A$ absorptions are all broader than those of $F_2^+$. FIG. 3 shows that the $(F_2^+)_A$ center luminescence in KBr, KI, and RbI peaks at 2.41, 3.00, and 3.20 μm. respectively. Compared with the corresponding peak values of the $F_2^+$ center (see Table 1), the $(F_2^{30})_A$-center bands exhibit a relatively large Stokes shift as is found in KCl. This shift is attributed to the movement of the $Li^+$ ion in its neighboring substitutional lattice site during the relaxation processes.

EXAMPLE II

A KI crystal with $Li(F_2^+)_A$ centers was prepared in the above manner and was placed in the laser apparatus described previously. The incident pump energy was about 4.1 mJ in a 5-μsec pulse, about 90% of which was absorbed by the crystal. The crystal was also exposed to auxiliary 514.5-nm light (∼0.3 W -cm$^{-2}$) during lasing. This light apparently had the beneficial effect of increasing the $(F_2^+)_A$ absorption. Removal of the auxiliary light decreased the laser output about 5% in intensity and narrowed the tuning range to 2.65–3.60 μm. The threshold for lasing was 0.2 mJ/pulse, and the efficiency about 3% (see FIG. 4). Two significant factors limiting efficiency in these preliminary measurements were relatively large cavity losses compared with output coupling. Finally, although long-term-stability measurements were not carried out, the laser output did not change in the course of several hours of nearly continuous operation (2 pulses/sec).

The relative populations of $F_2^+$ and $(F_2^+)_A$ centers can be altered by varying the conversion exposure. The $F_2^+$ center absorbs at 1.73 μm and was also found to lase when the same cavity elements of FIG. 1 were used. Although the optics of FIG. 1 were not well suited to the $F_2^+$ center, the $F_2^+$ center did nevertheless provide additional tunable output from 1.99 to 2.55 μm. However, since the $F_2^+$ absorption correspondingly increases at the expense of the $(F_2^{30})_A$ centers, this procedure also slightly narrowed the $(F_2^+)_A$ tuning range.

This example demonstrates that the lithium $(F_2^+)_A$ center in KI has an extremely broad tuning range extending continuously from 2.59 to 3.65 μm. These results should be of considerable importance in many areas, including chemical spectroscopy. This range covers most of the fundamental CH and OH vibrational modes. In addition, $F_2^+$ centers can coexist and lase with these $(F_2^+)_A$ centers, thus giving a potentially continuous tuning range from ∼2 to ∼3.65 μm in a single crystal.

EXAMPLE III

The incident energy was 4.1 mJ/pulse and the magnitude of the $F_2^+$ absorption before conversion to $(F_2^+)_A$ centers at 1.73 μm along the cavity direction, greater than 3 O.D. The crystal was colored with a 2 hour exposure to 2.2 MeV electrons (22 μamps/cm$^2$). Because of the large absorption and gain, the tuning as limited at both wavelength extremes by the fact that lasing switched to the emission peak (∼2.14 μm) and was occurring between the input mirror and output surface of the crystal. In addition, once the $F_2 \rightarrow F_2^+$ conversion reached a saturation limit, the lasing was stable without need for the auxiliary green light. This is in contrast to the behavior of $F_2^+$ centers following a partial conversion to $(F_2^+)_A$ centers. As a final point, because the input mirror used had a low reflectivity for $\lambda < 2.4$ μm, most of the color center lasing in this region was transmitted through the input end. This contribution was determined by comparing the reflectivities of the mirror and the grating, and was added to the grating output to yield the total output shown by the dashed curve in FIG. 5A. The $F_2^+$ lasing efficiency for total output had a maximum value of about 30%.

$(F_2^+)_A$ centers were produced by subsequently exposing the crystal at 148K to the green light. The conversion occured as a result of optically induced diffusion of $F_2^+$ centers via repeated reorientations. Unfortunately it was not possible to produce the same high concentrations of $(F_2^+)_A$ centers as $F_2^{30}$ since most of the $F_2^+$ centers bleach during this exposure. Exhaustive studies have not been carried out to optimize $(F_2^+)_A$ concentration, although it was generally found that the concentration increases with increasing electron dosage. It also increased with green light excitation at 148K although prolonged exposure eventually leads to $(F_2^+)_A$ center bleaching.

FIG. 5A shows that a crystal containing $(F_2^+)_A$ centers, predominantly, gives rise to lasing which tunes from 2.38 to 3.99 μm. The crystal was colored with a 5 hour exposure to 2.2 MeV electrons and a 45 min. exposure to green light at 148K. The input power was 6.4 mJ/pulse and the curve was recorded while the crystal was exposed to the auxiliary green light. Turning off the auxiliary light had little effect on the output power but narrowed the tuning range slightly to 2.52–3.92 μm. The absorption of the pump energy measured in the laser cavity under nonlasing conditions varied from a low of 42%, for full pump intensity, to a high of 84%, for a three order of magnitude decrease in pump intensity. This decrease evidently corresponds to a pump induced saturation caused by the leading portion of the pump pulse. These values were measured while the crystal was exposed to green light. The corresponding values of absorption with the green light off were 40% and 82%. The $(F_2^+)_A$ lasing efficiency, measured by replacing the grating with the silicon flat, was about 12% for energy incident on the crystal. Since 58% of the light was absorbed under color center lasing conditions, the output efficiency is 21% for absorbed pump power. The theoretical value is 54% based on Stokes shift losses.

Crystals were also studied in which $F_2^+$ centers were only partly converted to $(F_2^{30})_A$. The solid curve of FIG. 5B shows that the tuning range for one such crystal extends from 1.98 to 3.85 μm. The crystal was colored with a 3 hour exposure to 2.2 MeV electron (15 μamp/cm$^2$) and 30 min of green light at 148K. The pump energy used was 3.6 mJ/pulse and the spectrum was recorded while the crystal was exposed to green light. The dashed curve shows that the tuning narrows to 2.60 to 3.76 μm upon removal of this light. This result clearly indicates that $F_2^+$ centers now require an auxiliary green light for sustained laser output. This is in contrast to their behavior before conversion. The apparent $F_2^+$ optical instability also accounts for the slight differences in laser pump absorption noted above for the crystal with $(F_2^+)_A$ centers.

Figure 5:
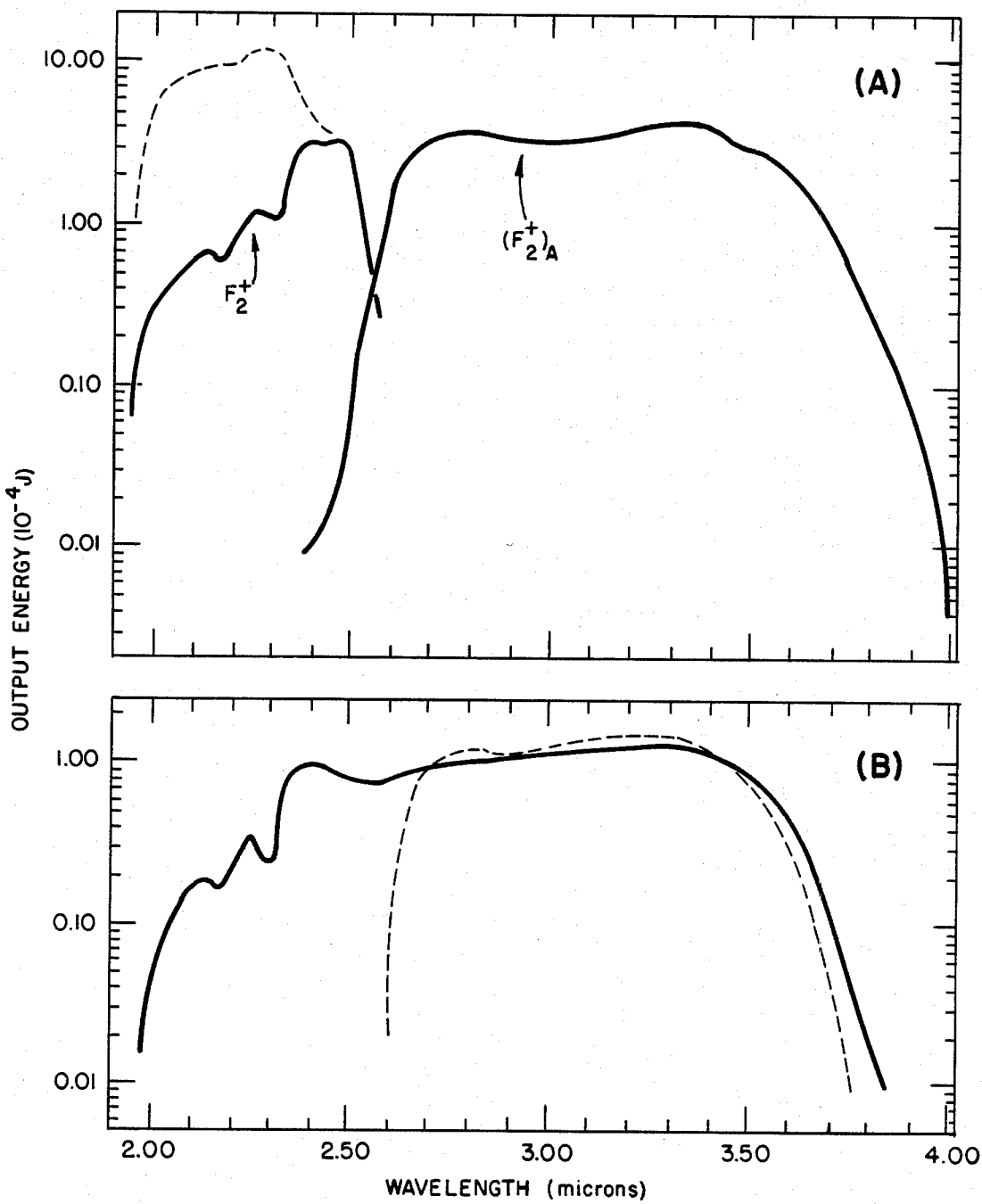
FIG. 5A is a graphic representation of the laser emission of the $F_2^{30}$ and the $Li(F_2^+)_A$ centers in a more heavily colored KI crystal.
FIG. 5B is the tuning curve for a laser utilizing both the $F_2^+$ and $(F_2^+)_A$ centers in a single crystal of KI.

The tuning range shown in FIG. 5 is several times broader than any known solid state laser using a single lasing medium and extends much further into the mid ir range than any prior color center laser, i.e. beyond 3.3 microns. This range is comparable to the range of those lasers utilizing several crystals for the lasing medium without requiring the necessity of adjusting the laser, i.e. changing the lasing medium. Hence a laser having a crystal of the present invention is capable of continuous lasing from less than 2 microns to almost 4 microns.

Obviously numerous modifications and variations of the present invention are possible in light of the above teachings. It is therefore to be understood that within the scope of the appended claims the invention may be practiced otherwise than as specifically described herein.

What is claimed is:

1. A laser material for a solid-state tunable laser which comprises a potassium or rubidium halide crystal having a lithium and/or sodium cation impurity, said crystal having a crystalographic structure with point defects consisting essentially of $F_2^+$ and $(F_2^+)_A$ color centers and electron traps, said $F_2^+$ and $(F_2^+)_A$ color centers being present in concentrations sufficient to obtain lasing from two types of color centers and said electron traps being present in a concentrations sufficient to prevent bleaching of said color centers.

2. The material of claim 1 wherein said electron traps consists essentially of ions selected from the group consisting of divalent metal ions, $OH^-$, $SH^-$, and mixtures thereof, said ions having a concentration from about 25 to about 150 ppm.

3. The material of claim 2 wherein said electron traps are divalent metal ions selected from the class consisting lead, palladium, and manganese ions and mixtures thereof, said ions having a concentration from 75 to 125 ppm.

4. The material of claim 2 wherein said crystal is potassium or rubidium iodide.

5. The material of claim 2 wherein said color centers are Li-$(F_2^+)_A$ and Na-$(F_2^{30})_A$ centers.

6. The material of claim 1 wherein said electron traps consists essentially of $(F_2)_A$, $F_A$, $F_B$, $F'_A$, and $F'_B$ color centers in a dynamic equilibrium with said $F_2^+$ and $(F_2^+)_A$ centers.

7. The material of claim 6 wherein said crystal is potassium or rubidium iodide.

8. The material of claim 4 or 7 wherein said cation impurity is lithium.

9. The material of claim 4 or 7 wherein said cation impurity is sodium.

10. The material of claim 4 or 7 wherein said cation impurity is an equal mixture of sodium and lithium ions.

11. The material of claim 1, 3, 6 or 7 wherein said color centers are $F_2^+$ and Li-$(F_2^+)_A$ centers.

12. The material of claim 1 wherein said color centers are $F_2^{30}$ and Na-$(F_2^+)_A$.

13. In a laser comprising a pumping means in association with a laser medium in a resonant cavity and an output means connected to said cavity the improvement comprising: said laser medium of a material comprising a potassium or rubidium halide crystal having a lithium and/or sodium cation impurity, said crystal having a crystalographic structure with point defects consisting essentially of $F_2^+$ and $(F_2^+)_A$ color centers and electron traps, said $F_2^+$ and $(F_2^+)_A$ color centers being present in concentrations sufficient to obtain lasing from two types of color centers and said electron traps being present in a concentration sufficient to prevent bleaching of said color centers.

14. The laser of claim 13 wherein said electron traps of said material are divalent metal ions selected from the class consisting of lead, palladium, and manganese ions and mixtures thereof in a concentration from 75 to 125 ppm.

15. The laser of claim 14 wherein said crystal is potassium iodide.

16. A method of continuously lasing over the spectrum from about 2 to 4 microns which comprises irradiating a material which comprises a potassium or rubidium halide crystal having a lithium and/or sodium cation impurity, said crystal having a crystalographic structure with point defects consisting essentially of $F_2^+$ and $(F_2^+)_A$ color centers and electron traps, said $F_2^+$ and $(F_2^+)_A$ color centers being present in concentrations sufficient to obtain lasing from two types of color centers and said electron traps being present in a concentrations sufficient to prevent bleaching of said color centers with light in the infrared absorption band of the $F_2^+$ and the $(F_2^+)_A$ centers to produce stimulated emission from the crystal throughout the emission band of the $F_2^+$ and $(F_2^+)_A$ centers and extracting said light from said material.

17. The method of claim 16 wherein said electron traps of said material are divalent metal ions selected from the class consisting of lead, palladium and manganese ions and mixtures thereof in a concentration from 75 to 125 ppm.

18. the method of claim 17 wherein said crystal is potassium or rubidium iodide.

* * * * *